CONTROL UNIT FOR MOBILE RADIO TELEPHONE SYSTEM

Filed Oct. 14, 1965 4 Sheets-Sheet 1

Inventors
RICHARD H. ADLHOCH, RONALD H. CHAPMAN &
ROY T. OGASAWARA
BY
Mueller, Aichele & Rauner
ATTYS.

CONTROL UNIT FOR MOBILE RADIO TELEPHONE SYSTEM

Filed Oct. 14, 1965

Inventors
RICHARD H. ADLHOCH,
RONALD H. CHAPMAN &
ROY T. OGASAWARA

BY Mueller, Aichele & Rauner

ATTYS.

CONTROL UNIT FOR MOBILE RADIO TELEPHONE SYSTEM

Filed Oct. 14, 1965 4 Sheets-Sheet 3

3,458,664
CONTROL UNIT FOR MOBILE RADIO TELEPHONE SYSTEM

Richard H. Adlhoch, Oak Lawn, Ronald H. Chapman, Wheaton, and Roy T. Ogasawara, Chicago, Ill., assignors to Motorola, Inc., Franklin Park, Ill., a corporation of Illinois Filed Oct. 14, 1965, Ser. No. 495,862
Int. Cl. H04m 5/04
U.S. Cl. 179—41 16 Claims

ABSTRACT OF THE DISCLOSURE

Supervisory control system for mobile unit in a radio telephone system providing automatic dial operation over a plurality of channels between base stations and mobile stations. The supervisory unit includes a detector responding to received pulses to select calls for the particular station, and cooperating with a pulsing circuit to transmit pulses identifying the station, with the detector being adapted to respond to tones at different frequencies for operation in different systems. The unit also responds to tones and provides tones for dialing and for connect, disconnect and acknowledge functions. A channel latch circuit controls the channel selecting operation of the radio equipment.

Figure 1:
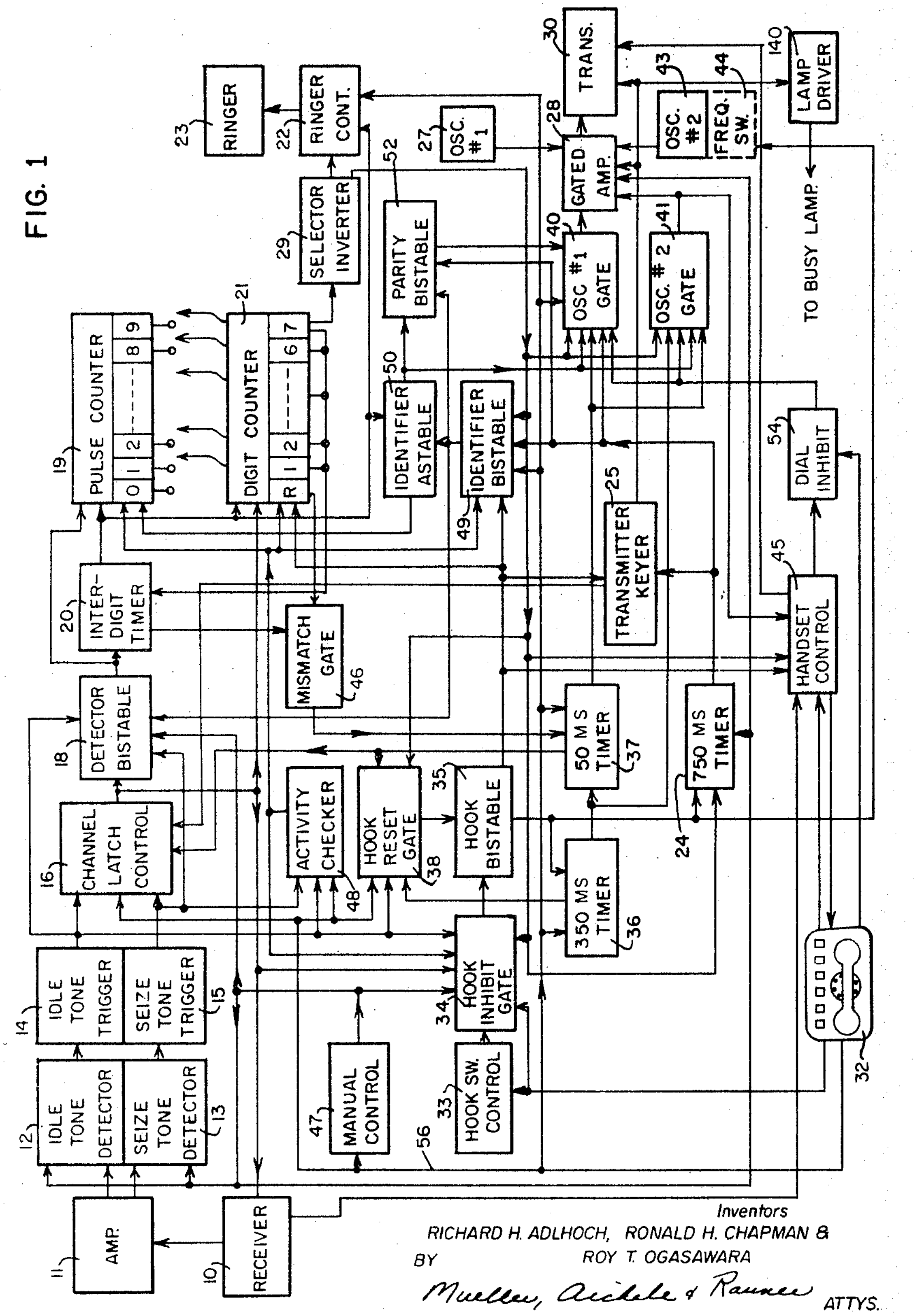

This invention relates generally to radio-telephone control systems, and more particularly to a supervisory unit for controlling mobile radio-telephone equipment for automatic operation.

Radio-telephone equipment has been provided to permit communication with persons at remote points or in moving vehicles over standard telephone circuits. However, the existing equipment has not provided completely automatic operation, and has required what is commonly called a mobile operator to make the connection from the radio equipment to the standard telephone equipment. Although it has been proposed to provide completely automatic equipment, a problem has been encountered in that the switching equipment required at the mobile or remote radio station has been relatively complex. Equipment using mechanical stepping switches is relatively large and not convenient for mounting in vehicles. Further, such equipment requires a substantial amount of power and is quite expensive. Inasmuch as the selecting equipment must be provided at each mobile or remote station, it is important that the cost be held as low as possible. This is a different problem than in a wire telephone station wherein the switching takes place at the central station and one set of equipment takes care of many subscriber stations.

A further problem in remote and mobile radio-telephone systems is that when a plurality of stations are provided on a single channel, as on a party line, a particular station may have to wait a substantial period of time while others are using the channel. It is therefore desired to make a plurality of channels accessible to each station. This complicates the switching action at each station, since all the stations must be connected to a common channel so that they can receive calls, and yet each station should be able to make a call as long as one of the channels is idle.

It is therefore an object of the present invention to provide an improved control system for a mobile or remote radio-telephone station.

Another object is to provide a supervisory unit for a mobile radio-telephone transmitter and receiver to provide automatic dial telephone operation over one of a plurality of channels.

A further object of the invention is to provide an automatic supervisory unit for a mobile automatic dial radio-telephone station, which uses only solid state components and which provides the same operation as a wired telephone substation.

Still another object of the invention is to provide a transistorized supervisory unit which controls both the selecting and dialing action at a radio-telephone station, and also the action of the radio equipment to switch to a marked channel so that it is available for receiving calls, and remains locked to a channel during use.

A still further object of the invention is to provide an improved system for latching the radio equipment on a channel marked by the base station, and for releasing the channel at the termination of a call.

A feature of the invention is the provision of a transistorized supervisory unit for radio-telephone equipment including detectors for converting tone signals into dial pulses to actuate a selector circuit when the code of the particular station is received, and apparatus for controlling the transmission of tone signals from the equipment for providing the stations code when making a call to identify the particular calling station, for applying the code designating a called station, and for providing the required switching action.

A further feature of the invention is the provision of a supervisory unit for radio-telephone equipment wherein components are connected to provide various different operations, and which includes an astable multivibrator for providing pulses, which is controlled by the selector circuit so that the pulses are applied in groups corresponding to the code of the particular station, with the astable circuit also acting to pulse tones for providing a disconnect signal, and wherein the unit includes a plurality of timers for providing different time intervals and which operates to provide acknowledge, connect, disconnect and other signals of the required durations.

Another feature of the invention is the provision of a supervisory unit for radio-telephone equipment which responds to tones representing the calling code of a particular station and transmits a tone to acknowledge receipt of the call, and which responds to ringing signals to provide audible and/or visible ringing signals to alert the operator to a call. When the operator picks up the handset, the equipment responds to the action of the hook-switch to provide signals which cause the equipment to be connected for normal telephone communication. An inhibit circuit prevents actuation of the hook-switch circuits when the hook-switch is actuated in the event that some part of the system is not in condition for normal communication.

A further feature of the invention is the provision of a supervisory unit which responds to action of the telephone hook-switch to cause the equipment to be latched to a particular radio channel, transmits tones indicating that a call will be made, causes the selector equipment to send a code identifying the station making the call, and when dial tone is received and the operator dials the number he wishes to call, converts the dial pulses to tones for radio transmission. The supervisory unit checks to see that a call is not being received at the time a call is initiated and causes the transmitter keyer to be actuated to transmit the tones produced in the system.

Figure 2A:
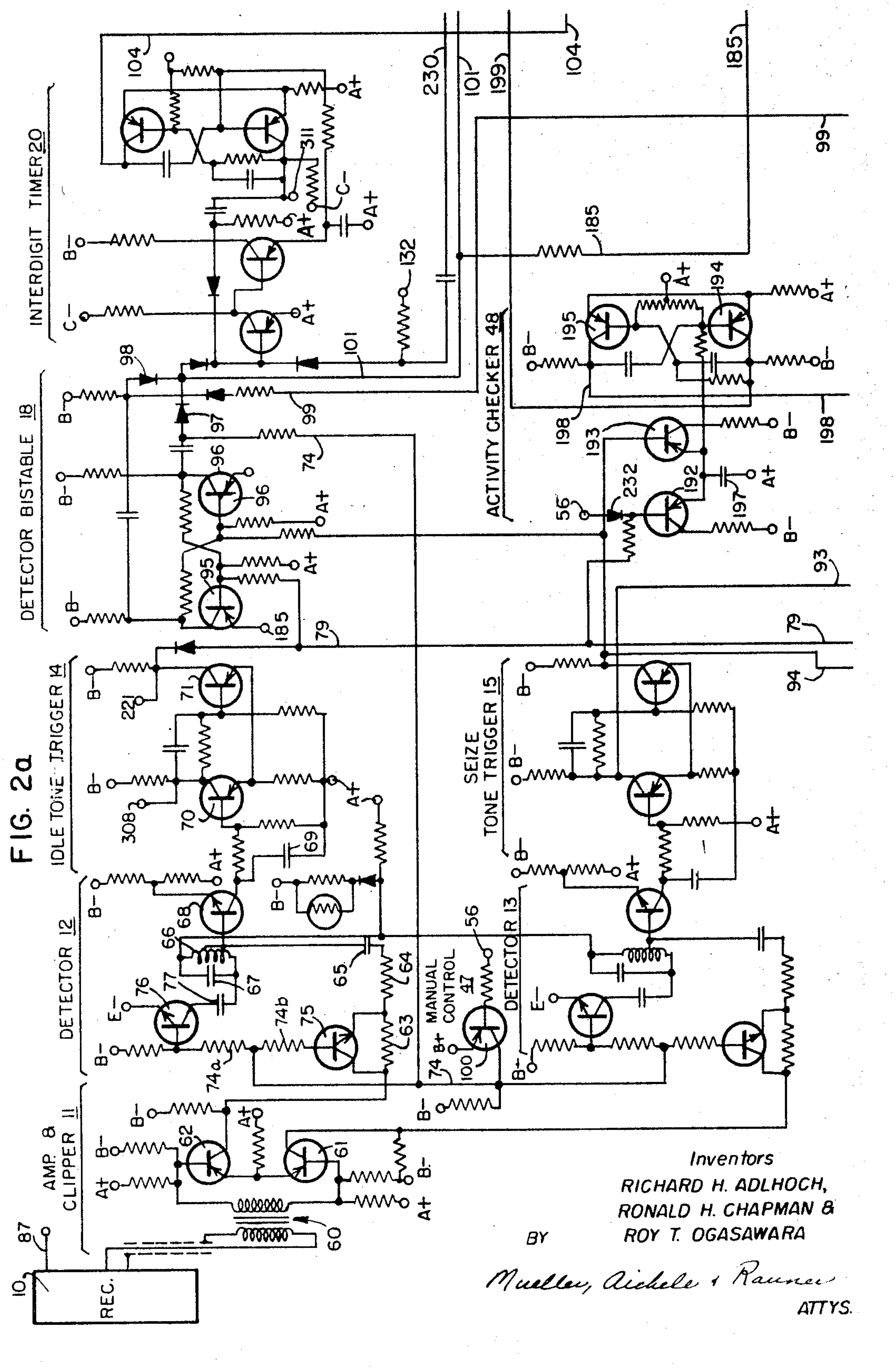
Figure 2B:
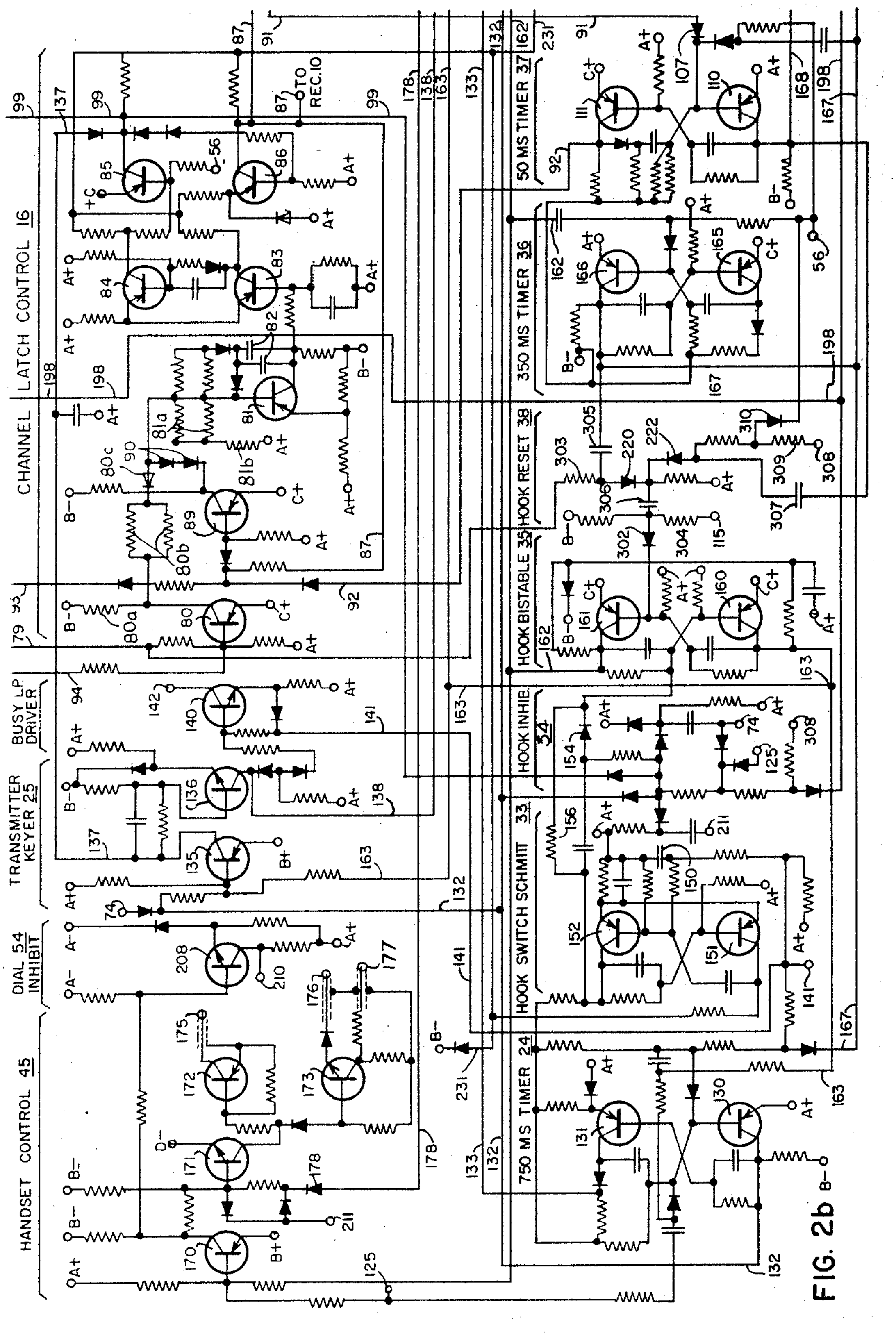
Figure 2C:
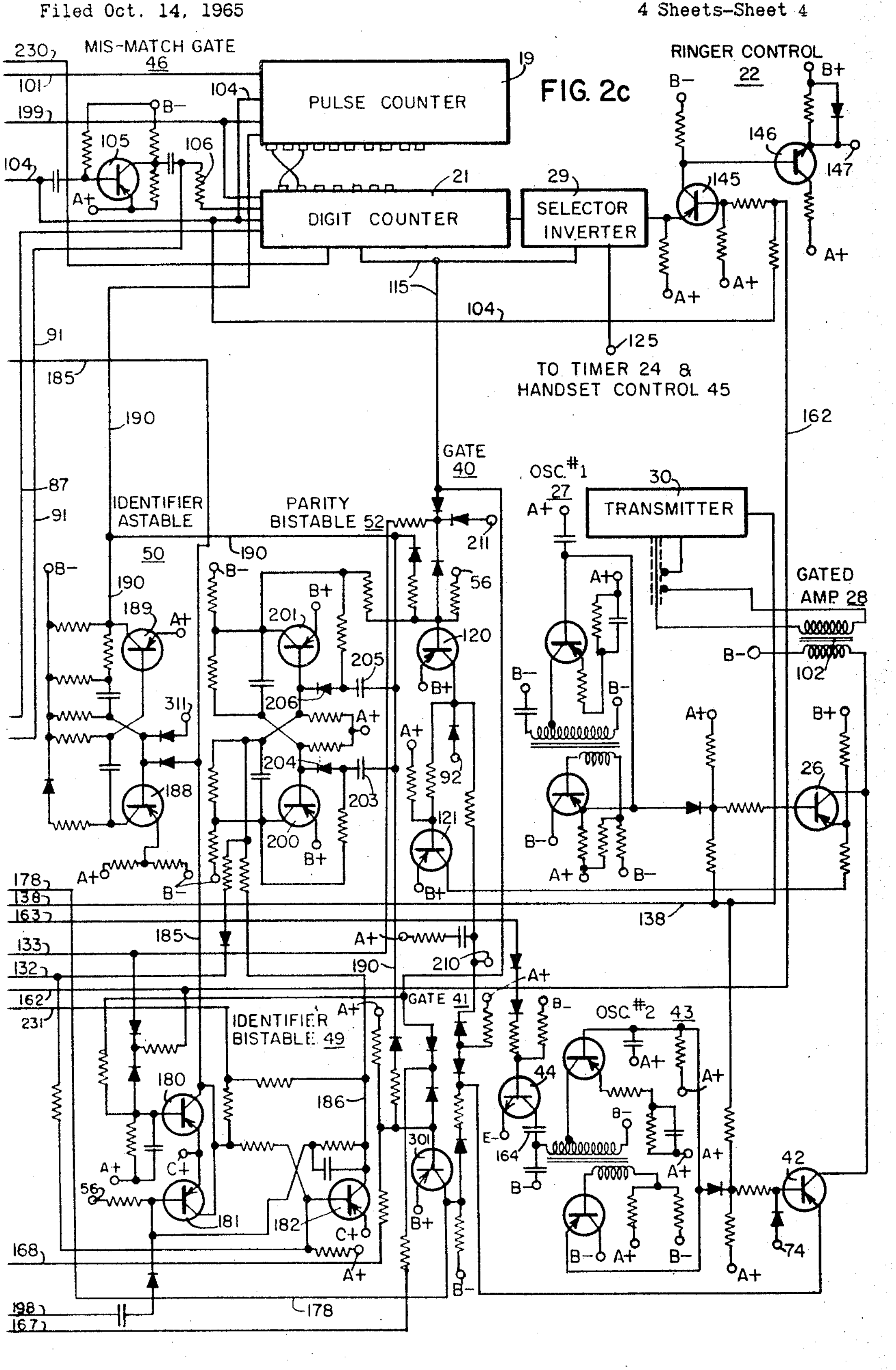

The invention is illustrated in the drawings wherein:

FIG. 1 is a block diagram of the radio-telephone supervisory unit of the invention; and FIGS. 2*a*, 2*b* and 2*c* together form a circuit diagram of the supervisory unit.

The supervisory system of the invention is used with two-way radio equipment to permit automatic dial operation from the mobile station to the base station, and from the base station to the mobile station. The mobile receiver is represented to FIG. 1 by the block 10 and the telephone control signals received therefrom are in the form of tone bursts. These are applied to the amplifier-clipper 11 and to two tone detector circuits 12 and 13. Each of the tone detector circuits may be controlled to respond to one of two different tones. In any setting the tone detector circuit 12 responds to one frequency and the tone detector 13 responds to a different frequency. The output of the tone detectors 12 and 13 are applied respectively to Schmitt trigger circuits 14 and 15 which provide pulse outputs in response to the detected tone signals.

The radio system is a multi-channel system, with each mobile receiver being adapted to receive signals of a plurality of radio frequencies, and each mobile transmitter being adapted to transmit radio frequency signals of a plurality of different frequencies. Such a system is described in application Ser. No. 335,931, filed Jan. 6, 1964. The base station transmitter applies a tone called the idle tone to mark one channel of the multi-channel system, and all receivers in the system which are not being used for communication or signalling are tuned to this channel. The frequency (2000 cycles per second) of the idle tone is selected by the tone detector 12 and applied through the Schmitt trigger circuit 14 to the channel latch control circuit 16. This applies a signal to the receiver to stop the channel hunting action of the receiver so that the receiver remains latched to the channel on which the idle tone is applied. In the absence of the idle tone, the receiver will switch from one channel to another until the idle tone is detected.

Base station to mobile call

When a call is made to the mobile stations from the base station, a seize tone (1800 cycles per second) replaces the idle tone and this is detected by the tone detector 13. This applies a signal to actuate the channel latch circuit 16, which applies a control to the receiver 10 so that it remains latched to the channel which has been seized. After the seize tone is received, the base station applies the calling code of the desired mobile station by interrupting the seize tone with the idle tone. In such case the two frequencies, 1800 cycles per second and 2000 cycles per second, will be intermittently transmitted to intermittently actuate the detectors 12 and 13. The detectors in turn actuate the trigger circuits 14 and 15 which apply pulses to the detector bistable circuit 18. This produces a series of dial pulses as commonly used for telephone dialing operations. The dial pulses are applied by the detector bistable circuit 18 to the selector system including pulse counter 19, inter-digit timer 20, and digit counter 21. The pulse counter counts the pulses of each group, and the inter-digit timer 20 applies a pulse to the digit counter 21 and to the pulse counter 19 at the end of each group of pulses representing one digit of the calling code number. The pulse counter, inter-digit timer and digit counter cooperate with each other to provide an indication when the calling code of a particular station is received. The detailed construction and operation of the selector is described in application Ser. No. 425,749, filed Jan. 15, 1965.

When the incoming code matches the preset code set-up in the selector of a particular mobile unit, the output of the digit counter operates the selector inverter 29 which triggers the timer 24 which has a period of 750 milliseconds. The timer 24 triggers the transmitter keyer 25 and also enables the oscillator No. 1 gate 40 to feed the tone from the oscillator 27 through the gated amplifier 28 to the transmitter 30. Oscillator 27 provides what is called guard tone, which may be of a frequency of 2150 cycles per second. The guard tone is received at the base station as an acknowledgement that the mobile unit has received its calling code. The base station then transmits ringing signals which are formed by alternate bursts of tone of 1800 and 2000 cycles. The ringing signals are applied through the selector to the ringer control 22 to actuate the ringer 23.

When the incoming code does not match the preset code set-up in the selector, the digit counter 21 actuates the mismatch gate 46. The mismatch gate turns on the timer 37 which unlocks the channel latch circuit to cause the mobile to search for the marked idle channel.

The ringer 23 may be part of a standard telephone substation shown at 32. In response to the ringing signal, the operator at the mobile station will remove the handset of the telephone substation 32 from its cradle, in the manner one normally answers a telephone call. This operates the hook-switch circuit of the supervisory unit which locks the channel latch control 16 so that the mobile receiver stays latched to the same channel. Operation of the hook-switch of the telephone 32 actuates the hook-switch Schmitt trigger circuit 33 which is coupled through the hook inhibit circuit 34 to the hook bistable circuit 35. The hook bistable circuit actuates the transmitter keyer 25 and the timers 36 and 37. Timer 36 provides a 350 millisecond interval, and timer 37 provides a 50 millisecond interval for a total of 400 milliseconds. The timers 36 and 37 actuate the oscillator #2 gate control 41 which enables the gated amplifier 28 to transmit tone from oscillator 43 to the transmitter 30. The tone from oscillator 43 serves as a connect tone and may be at a frequency of 1633 cycles per second. When this connect tone is received at the base station, the ringing signal is removed and conversation may begin. The gate control 41 actuates the handset control 45 to inhibit the audio circuits during the connect tone.

After the call is completed, the mobile operator hangs up the handset so that the hook-switch circuit 33 unlatches the hook bistable 35. This operates the timer 24 which in turn actuates the transmitter keyer 25, as previously described. The hook bistable 35 acts through the frequency change switch 44 of the oscillator 43 to change the frequency of oscillator 43 from the connect tone to the disconnect tone, which may be 1336 cycles per second. The oscillator gate controls 40 and 41 are operated by the identifier astable 50 to transmit a disconnect signal made up of alternate pulses of disconnect tone from oscillator 43 and guard tone from oscillator 27.

Mobile to base station calling

Considering now the action when it is desired to initiate a call from the mobile station, when the handset of the telephone unit 32 is removed, the hook-switch is actuated and operates the hook-switch Schmitt trigger circuit 33. The trigger circuit 33 operates the hook bistable 35, unless this action is inhibited by the hook inhibit circuit 34. The hook inhibit circuit prevents operation of the hook bistable 35 and acts in response to a signal from the channel latch circuit 16 when the unit is not on an idle channel, in response to a signal from the idle tone Schmitt trigger circuit 15 when some other mobile has seized the channel, in response to a signal from the activity checker 48 when any mobile is being called and in response to a signal from the 750 millisecond timer 24 when the acknowledge or disconnect signal is being transmitted. A signal is applied to the hook inhibit signal 34 from the selector inverter 29 when the correct code call is received and this overrides the inhibit action of the idle tone detector and of the activity checker.

The hook bistable 35 actuates timers 36 and 37 and the transmitter keyer 25. The hook bistable 35 also actuates the frequency change switch 44 of the oscillator 43 to provide the connect tone. The timers 36 and 37 operate through the gate controls 40 and 41 to provide 350 milliseconds of guard tone from oscillator 27, followed by 50 milliseconds of connect tone from oscillator 43. The base station will respond to the connect tone and remove idle tone from the channel on which the mobile is calling. This will cause all other mobiles to move from this channel. The base station then transmits seize tone, and then discontinues the seize tone when it is ready to receive the mobile identification. The initiation of the seize tone will be detected by the detector 13 which acts through Schmitt trigger circuit 15 to actuate the activity checker 48. In the event the channel is seized by another mobile station, or the base station fails to receive the connect tone, the hook reset gate 38 restores the hook bistable 35 to its original condition and blocks an attempted call.

In the event there is no incoming call, the activity checker 48 actuates the identifier bistable 49, which in turn controls the identifier astable 50. The identifier astable 50 is coupled to the pulse counter 19 and is controlled by the inter-digit timer 20 so that it produces pulses representing the calling code to which the digit counter responds. The pulses are also applied to the parity bistable circuit 52 and to the gate controls 40 and 41, and cause the tone from oscillator 27 to be interrupted by the tone from oscillator 43. The oscillator 43 produces the connect tone at 1633 cycles per second, and oscillator 27 produces guard tone at 2150 cycles per second. During identification, the mobile sends connect tone (1633 c.p.s.) with guard tone (2150 c.p.s.) being transmitted after each even numbered pulse, and unmodulated carrier after each odd numbered pulse. These pulses are transmitted to identify the mobile station which is calling. When the base station receives the identifying pulses it sends dial tone to the mobile subscriber. Pulses from the telephone dial are then applied through the dial inhibit gate 54 to the oscillator gate controls 40 and 41. During dialing the guard tone is interrupted by the connect tone.

After dialing, the operator waits for the called party to answer, and the phone is used in the same manner as a standard dial telephone. When the conversation is completed, the operator places the handset on the telephone cradle and again the disconnect signal is sent. This is a 750 milliseconds signal with alternate 25 millisecond pulses of disconnect tone (1336 c.p.s.) and guard tone (2150 c.p.s.).

Manual operation

The substation 32 includes a switch which can be operated to select automatic or manual operation of the system. During manual operation, a negative potential is applied on conductor 56 which extends from the substation 32 to the manual control unit 47 and to other components of the system. During automatic operation, a positive potential is applied from the substation 32 to the conductor 56.

As previously stated, the tone detectors 12 and 13 are each arranged to operate at two different frequencies. For automatic operation, tone detector 12 responds to 2000 cycles and tone detector 13 to 1800 cycles. During manual operation, tone signalling is provided by alternate pulses of 600 and 1500 cycle tones. For such operation, the manual control 47 causes the tone detector 12 to be switched to operate at 1500 cycles and the tone detector 13 to be switched to operate at 600 cycles. The detectors apply pulses to the detector bistable 18 and the bistable applies pulses to the pulse counter 19. The action of the detector bistable 18 is different for manual operation, providing a pulse in response to each change of state, rather than a pulse each time the bistable changes to one of its two states.

The operation of the ringer is different for manual operation, the ringer operating continuously when the selector inverter is operated in response to the proper calling code, when the manual control is actuated. During manual operation no tones are transmitted from the mobile station. Also, there is no hook-switch inhibit action, except to prevent the mobile from going "off hook" in the event the handset is removed when the push-to-talk switch is operated.

The activity checker 48 is also different for manual operation. During manual operation the activity checker responds to both the 600 and the 1500 cycle tones which are used for dialing, whereas during automatic operation the activity checker responds only to the seize tone.

Detailed description

Considering now the specific circuits which may be used in the system of FIG. 1, reference is made to the circuit diagram of FIGS. 2*a*, 2*b* and 2*c*. The amplifier and clipper circuit 11 (FIG. 2*a*) is composed of two transistors 61 and 62 connected in a differential amplifier configuration to which signals from the receiver are applied through transformer 60. One end of the secondary winding of transformer 60 is connected to the base of transistor 61 and the other end of the secondary winding is connected to the base of transistor 62. The transistors 61 and 62 amplify the signal and limit the output when a predetermined value is reached. The output of transistor 61 is derived from the collector thereof and applied to detector 13, and the output of transistor 62 is derived from its collector and applied to detector 12.

Tone detectors

The tone detectors 12 and 13 are substantially identical, having components of different values to provide operation at different frequencies. The tone signal from the collector of transistor 62 is applied through resistors 63 and 64 and capacitor 65 to the tone filter formed by coil 66 and capacitor 67. The signals selected by the filter are applied to the base of transistor 68 and each positive going half-cycle causes the transistor to conduct. This applies a charge from the collector electrode to capacitor 69. The capacitor 69 will charge fully on a few cycles of each tone pulse and although it attempts to discharge during the negative going half-cycles, the time constants are such that the capacitor will not substantially discharge.

The negative voltage across the capacitor 69 produced by the selected tone is applied to the base of transistor 70 of the Schmitt trigger circuit 14. This stage is normally turned off and the negative voltage applied to the base turns on the transistor 70. The second stage of the Schmitt trigger including transistor 71 is normally on and is turned off when the stage 70 is turned on. When the stage 71 is turned off, the collector assumes a negative direct current value and this is applied to various other circuits of the system as shown in the block diagram of FIG. 1, and as will be further described in connection with FIG. 2.

As previously stated, the detectors 12 and 13 are adapted to operate at two different frequencies. For automatic operation the detector 12 operates to select tones at 2000 cycles, and for manual operation this detector responds to tones of 1500 cycles. The change in the tuning is controlled by action of transistors 75 and 76. These transistors are rendered conducting by a potential applied to conductor 74 from the manual control 47. Transistor 100 is rendered conducting by the potential applied at terminal 56 so that the positive potential from the emitter is applied to the collector and to conductor 74. This potential is applied through resistor **74*a* to the base of transistor 76, and since the emitter of this transistor is connected to a negative potential, transistor 76 will conduct. This positive potential is also applied through resistor 74*b* to the base of transistor 75. The emitter of transistor 75 is connected through resistor 63 to the collector of transistor 62, which is always negative with respect to the positive voltage on conductor 74, so that transistor 75 conducts. Transistor 75, when conducting, shorts out resistor 63 to provide the proper impedance match for operation with a 1500 cycle tone signal. Transistor 76, when conducting, connects capacitor 77 in parallel with capacitor 67 to change the tuning of the tone filter. This lowers the tuning from 2000 cycles to 1500 cycles. Accordingly, the detector 12** is readily converted for operation to select either a 2000 cycle tone or a 1500 tone.

The tone detector 13 and Schmitt trigger circuit 15 include the same configuration and operate in the same way as the detector 12 and trigger circuit 14. The detector 13 operates to select tones having a frequency of 1800 cycles for automatic operation, and of 600 cycles for manual operation. The matching impedance is changed by shorting out a series resistor, and an additional capacitor is bridged across the tone filter, as has been described in connection with the tone detector 12.

Channel latch circuit

Signals from both the idle tone Schmitt circuit 14 and the seize tone Schmitt circuit 15 are applied to the channel latch control circuit 16. When the idle tone is received by the mobile receiver, a negative signal is fed from the collector of transistor 71 of the Schmitt trigger circuit 14 through conductor 79 to the base of transistor 80 in the channel latch control circuit 16 (FIG. 2*b*). Transistor 80 is normally cut off and the B— negative potential applied through resistor 80*a* to its collector is applied through resistor 80*b* and diode 80*c* to the base of transistor 81, which is connected through resistors 81*a* and 81*b* to the positive potential A+. Transistor 80 is turned on by the negative signal applied through conductor 79 and its collector goes positive to reverse bias diode 80*c*. This causes the base of transistor 81 to go positive from the potential through resistors 81*a* and 81*b* so that the positive signal developed at the collector of transistor 80 is effectively coupled to the base of transistor 81 driving this transistor into cut off. The collector of transistor 81 slowly goes negative as capacitor 82 starts to charge. The idle tone signal must be continuously received for 120 milliseconds to charge capacitor 82 sufficiently to forward bias the base-emitter junction of transistor 83. This causes the Schmitt trigger circuit including transistors 83 and 84 to operate so that a negative signal is developed at the collector of transistor 84 and applied to the base of transistor 85, driving it into saturation. This causes transistor 86 to go into cut off, and the positive return path through conductor 87 to the mobile receiver is interrupted. This acts to stop the search action in the mobile unit and to lock the receiver on the channel which provides the idle tone. The collector of transistor 86 is also connected through conductor 87 to the base of transistor 89. This holds transistor 89 in saturation so that a positive signal is fed from its collector to reverse bias diodes 90.

The channel latch circuit holds the mobile unit locked on channel as long as either idle tone or seize tone is received. The seize tone Schmitt trigger 15 provides a negative signal through conductor 94 to the base of transistor 80 to provide the same action which has been described by action of the idle tone Schmitt trigger circuit 14. In the event that neither idle tone nor seize tone is received, transistor 80 returns to its original cut-off condition, and transistor 81 is driven into saturation and its collector slowly becomes positive. Due to the time constant on the network, the Schmitt trigger including transistors 83 and 84 remains activated for a period of 160 milliseconds. If neither idle or seize tone is received during this interval, the Schmitt trigger reverts to its original stage and transistor 86 goes into saturation. This provides the positive return path to the mobile receiver which acts to unlatch the mobile unit so that it searches for the next idle channel.

When the mobile unit is locked on channel and is receiving a calling code from the base station, if the signals received do not correspond to the calling code for the particular mobile station, a signal is produced by the mismatch gate 46 (FIG. 2*c*). The transistor 105 of the mismatch gate 46 is normally in saturation, and when a pulse is applied thereto on conductor 104 from the inter-digit timer 20 at the end of each pulse group, it generates a positive pulse. The connection from the digit counter through resistor 106 inhibits the pulse when a match is indicated by the digit counter. Under such condition, the resistor 106 applies a negative signal to diode 107 which reverse biases this diode to inhibit the pulse transfer. If there is a mismatch, the inhibit action does not take place, and the pulse is fed through conductor 91 and diode 107 to the timer 37.

50 milliseconds timer

The timer 37 is a monostable multivibrator including transistors 110 and 111, which provides a time interval of 50 milliseconds. When a code mismatch occurs, the positive signal on conductor 91 is applied to the base of transistor 110. This cuts off transistor 110 and causes the timer to change state for an interval of 50 milliseconds. A negative signal is developed at the collector of transistor 110 and a positive signal is developed at the collector of transistor 111. The positive signal is applied through conductor 92 to the base of transistor 89 in the channel latch circuit.

Since transistor 89 of the channel latch control circuit is in saturation while the mobile unit is locked on channel, it is driven into cut off by the positive signal so that the collector electrode goes negative. This causes the capacitor 82 to rapidly discharge through diodes 90 so that the collector of transistor 81 goes positive and the Schmitt trigger circuit 83–84 reverses to its initial state. This again drives transistor 86 into saturation, and the negative signal which locks the mobile unit is removed, so that the mobile unit is unlatched and will search for the new marked idle channel.

When the mobile unit is in search condition, and no seize tone is detected, a negative signal is applied from the seize tone Schmitt trigger 15 through conductor 93 to the base of transistor 89 of the channel latch circuit. This overrides the positive signal applied from the collector of transistor 86 on conductor 87, and causes transistor 89 to be driven into saturation. This causes the diodes 90 to become back biased. If seize tone appears on the channel before 120 milliseconds of idle tone is received, the seize Schmitt trigger 15 changes state and a positive signal is applied on conductor 93 to the base of transistor 89. This drives transistor 89 into cut off, as previously described, so that capacitor 82 rapidly discharges through diodes 90 and transistor 81, and the Schmitt trigger circuit 83–84 remains in its original state so that the mobile unit continues its search for the marked idle channel.

Detector bistable

The signals from the idle tone Schmitt trigger circuit and the seize tone Schmitt trigger circuit are both applied to detector bistable 18. As previously stated, for dialing in the automatic mode, dial pulses are provided by alternately applying idle tone and seize tone so that the Schmitt circuits 14 and 16 are alternately actuated. The voltage from the collector of transistor 71 of the Schmitt trigger 14 is applied to the base of transistor 95 of the detector bistable 18. Similarly, the voltage from the collector of the output transistor of the Schmitt trigger 15 is applied to the base of transistor 96 of the detector bistable 18. The condition of the bistable depends on which of the idle tone or the seize tone is being received or was last received. The bistable changes state and generates a pulse in response to change from one tone to the other. When the idle tone is received, the positive pulse from the collector of transistor 95 is applied through diode 98 to the inter-digit timer 20, and through conductor 101 to the pulse counter 19. During automatic operation, the diode 97 is reverse biased to prevent the application of pulses from the collector of transistor 96 to the pulse counter 19 and the inter-digit timer 20.

The anode of diode 98 is connected to the collector of transistor 85 of the channel latch control through conductor 99, and when the mobile is not locked on channel, a negative signal is applied to the anode of diode 98 to back bias this diode. This prevents the application of pulses from the detector bistable 18 to the pulse counter 19 and the inter-digit timer 20 when the mobile unit is searching for an idle channel.

In the manual mode of operation, transistor 100 of the manual control 47 is rendered conducting to apply a positive potential to conductor 74 to change the frequency of the detectors 12 and 13, as previously described. The positive potential on conductor 74 is also applied to the anode of diode 97 of detector bistable 18, so that the diode 97 is forward biased. Accordingly, a positive pulse is fed from the detector bistable 18 to the pulse counter 19 and to the inter-digit timer 20 each time the bistable 18 changes state. This action is required because for manual operation the frequency changes from one frequency to the other (600 and 1500 cycles) for each dial pulse.

The operation of the inter-digit timer 20, pulse counter 19, digit counter 21 and mismatch gate 46 (FIG. 2*c*) in response to dial pulses is fully described in application Ser. No. 425,749, filed Jan. 15, 1965, and will not be described in detail. When the calling code of a particular unit is received, a signal is applied from the digit counter 21 to selector inverter 29. The selector inverter prevents resetting of the digit counter 21 through the connection provided by conductor 115, which also connects the selector inverter to the oscillator control gates 40 and 41. The selector inverter 29 also applies a signal on line 125 to the 750 millisecond timer 24, the handset control 45, and the ringer control 22.

750 milliseconds timer

The 750 milliseconds timer 24 (FIG. 2*b*) includes transistors 130 and 131, with transistor 130 being normally in saturation and transistor 131 being in cut-off. When the signal is applied through conductor 125 to transistor 130, it is turned off and transistor 131 is turned on. A negative signal is thus generated at the collector of transistor 130 which is applied through conductor 132 to the transmitter keyer 25. A positive signal is developed at the collector of transistor 131 and applied through conductor 133 to the oscillator control gate 40.

Transmitter keyer

The transmitter keyer 25 (FIG. 2*b*) includes transistors 135 and 136, with transistor 135 functioning as a NOR gate, and transistor 136 forming a drive amplifier. The signal from the 750 millisecond timer applied through conductor 132 to the base of transistor 135 causes a positive signal to be developed at the collector of transistor 135 which is fed through conductor 137 to the channel latch control 16 to inhibit operation thereof. This signal clamps the channel latch control circuit to prevent the mobile from searching while in the transmit condition. A negative signal developed at the collector of transistor 136 of keyer 25 is applied through conductor 138 to the gated amplifier 28 and to the transmitter 30 to key the transmitter.

The signal from transistor 136 of the transmitter keyer 25 is also applied to the busy lamp driver circuit transistor 140. This acts to energize a busy lamp on the control head. The transistor 140 is normally biased into cut-off. Terminal 141, which is connected to the base and emitter of transistor 140, is connected through the hook-switch contacts on the control head to A—, and when the handset is removed from its holder, the hook-switch contacts are closed and A— is applied to the transistor 140. If the transmitter keyer 25 is not activated when the hook-switch contacts close, transistor 140 is biased into saturation and A— is applied to the terminal 142 which is connected to the busy lamp. This causes the busy lamp to be illuminated. If the transmitter keyer is actuated, the negative signal applied from transistor 136 of the keyer drives the base of transistor 140 negative to maintain the transistor 140 cut off, so that the busy lamp does not light.

Oscillator controls

Oscillator control gate 40 (FIG. 2*c*) controls the transmission of guard tone. This gate includes transistors 120 and 121, with transistor 120 being normally cut off, and transistor 121 being normally conducting. Transistor 121, when conducting, applies a positive signal from its collector to the emitter of transistor 26 of the gated amplifier 28. The transistor 26 does not conduct, however, until the transmitter keyer 25 is activated. The signal applied on conductor 138 from the transmitter keyer 25 to the base of the transistor 26 renders this transistor conducting so that guard tone from oscillator 27, which is applied to the base thereof, is passed through the transformer 102 to the transmitter 30. Since the transmitter keyer 25 has turned on the transmitter, the guard tone is transmitted. At the end of the 750 millisecond interval, a signal is applied on conductor 133 from the timer 24 to the base of transistor 120 of the control gate 40. This causes transistor 120 to conduct, and cuts off transistor 121, which cuts off transistor 26 to cut off the guard tone. The 750 millisecond length transmission of guard tone is applied to the base station as an acknowledge signal indicating that the correct code has been received.

Ringer control

In response to the acknowledge signal, the base station applies alternate pulses of idle and seize tone. These pulses are received by the detectors 12 and 13 and operate through the Schmitt triggers 14 and 15 and the detector bistable 18 to actuate the inter-digit timer 20. The inter-digit timer applies signals on conductor 104 to the base of transistor 145 of the ringer control 22. This drives transistor 145 into saturation, which in turn drives transistor 146 into saturation. The positive signal at the emitter of transistor 146 is applied to terminal 147 connected to the ringer.

During manual operation, a negative signal is continuously fed from terminal 56 to the base of transistor 145 of the ringer control. This will cause the ringer to operate whenever the selector inverter 29 is operated by the digit counter 21.

Hook-switch operation

When the mobile operator hears the telephone ring, he lifts up the handset in the normal way to answer the call. As previously stated, the terminal 141 (FIG. 2*b*) is connected to the hook-switch contacts of the handset. The signal on terminal 141 is applied to the hook-switch Schmitt trigger circuit 33. The hook-switch circuit 33 includes transistors 151 and 152, with transistor 151 normally being saturated and transistor 152 being cut off. When the handset is removed, contacts are closed by the hook-switch which apply a negative potential to terminal 141, and this potential acts to charge capacitor 150 to render transistor 152 conducting. When transistor 152 is rendered conducting, a positive signal is generated at its collector which is applied to the hook inhibit gate 34.

The hook inhibit gate 34 has a plurality of inputs to which signals may be applied to inhibit the application of signals from trigger circuit 33 to the hook bistable 35. The hook inhibit gate 34 includes diode 154 which is reversed biased to turn off the gate. In such case the mobile subscriber is always "on hook," and cannot go "off hook." When diode 154 is forward biased, the gate is turned on and the subscriber may go "off hook" to trigger the hook bistable 35. Starting of the 750 millisecond timer (to transmit the acknowledge signal) in response to receipt of the calling code applies a negative signal on conductor 132 (as previously stated) and this is applied to diode 154 to back-bias the same so that the mobile subscriber cannot go "off hook" when the acknowledge (or disconnect) signal is being transmitted. When the mobile is searching for an idle channel, a negative signal is fed from the channel latch control 16 through conductor 99 to the hook inhibit gate 34, and this again back-biases diode 154. This prevents the mobile operator from initiating a call when the mobile unit is not resting on an idle channel. When none of these conditions exist, the removal of the handset from the cradle actuates the hook-switch Schmitt circuit 33, so that a signal is applied through the hook inhibit gate 34 to the hook bistable 35.

The hook bistable circuit 35 includes transistors 160 and 161. This is a bistable multivibrator circuit with transistor 160 normally being in saturation and transistor 161 normally being cut off. When the positive pulse from the hook-switch circuit 33 is applied through the hook inhibit gate 34, this is applied to the base of transistor 160 and this potential turns off transistor 160 so that its collector goes negative. This causes transistor 161 to turn on, and its collector goes positive. The positive output from the collector of transistor 161 is applied through conductor 162 to the 350 millisecond timer 36 and to the identifier bistable 49. This biasing potential is also applied to the base of transistor 145 of the ringer control 22 (FIG. 2*c*) to terminate the ringing.

The negative potential at the collector of transistor 160 is applied through conductor 163 to turn on the transmitter keyer 25, and to the transistor 44 to change the frequency of oscillator 43. The transmitter keyer 25 acts to energize the transmitter 30 and to render the transistors 26 and 42 of the gated amplifier 28 conducting. The action of the hook bistable through conductor 163 causes frequency change transistor 44 to cut off to disconnect capacitor 164 from the tuned circuit of oscillator 43. This causes the oscillator to change frequency to produce the connect tone, which is 1633 cycles per second.

350 milliseconds timer

The 350 millisecond timer 36 is a monostable multivibrator including transistors 165 and 166. Transistor 165 is normally biased into cut off, and transistor 166 is biased into saturation. The positive pulse on conductor 162 from the hook bistable 35 is applied to the base of transistor 166 and acts to turn off this transistor so that transistor 165 is turned on. The negative signal at the collector of transistor 166 is applied through conductor 167 to one input of the 750 millisecond timer to inhibit operation thereof. The negative signal on conductor 167 is also applied to transistor 301 of the gate control 41 to turn it on, and its collector then goes positive. Since the collector of transistor 301 is connected to the emitter of transistor 42 in the gated amplifier 28, transistor 42 is rendered conducting. This enables tone from oscillator 43, whose frequency had previously been changed to produce connect tone, to be passed through the transformer 102 to the transmitter 30.

At the end of the 350 millisecond period, the timer 36 relaxes and the positive potential developed at the collector of transistor 166 is applied through conductor 167 to the 50 millisecond timer 37. As previously stated, the 50 millisecond timer is a monostable multivibrator. The positive pulse from timer 36 is fed to the base of transistor 110, and a negative signal is developed at the collector thereof and is applied through conductor 168 to control gate 41 (FIG. 2*c*). This holds the transistor 301 of the control gate 41 conducting so that the transistor 42 at the gated amplifier 28 remains actuated to continue the transmission of the connect tone for an additional period of 50 milliseconds.

Hook reset gate

The hook reset gate 38 is a combination of two AND gates including diodes 220 and 222. The outputs of these gates are connected together through another AND gate which includes diode 302. If the subscribed goes "off hook" to initiate a call, the hook bistable circuit 35 changes to its "off hook" state, and the 350 millisecond timer 36 is triggered.

If the channel has just been seized by another mobile station, the idle tone from the base station will be dropped before the particular mobile has sent out connect tone; that is, idle tone will be dropped before the 50 millisecond timer 37 is triggered, or during the time that the 350 millisecond timer 36 is triggered. Consequently, when the 350 millisecond timer 36 relaxes, the positive signal on the collector of transistor 166 will be applied through capacitor 305, and will pass through diode 220, capacitor 306, and diode 302, and reset the hook bistable circuit 35 to its "on hook" condition, and the call attempt is blocked.

If, after the mobile station has gone "off hook" to initiate a call, the idle tone is not dropped before the 350 millisecond timer 36 relaxes, then the idle tone Schmitt circuit 14 applies a negative signal on terminal 79 to resistor 303 of the hook reset circuit, which reverse biases diode 220. The pulse from the 350 millisecond timer 36 will now be blocked from resetting the hook bistable 35.

If, however, the idle tone is not removed during the interval of the 50 millisecond timer 37, then when the 50 millisecond timer 37 relaxes, the positive signal on the collector of transistor 110 will be applied through capacitor 307, and will pass through diode 222, capacitor 306, and diode 302, and reset the hook bistable circuit 35 to its "on hook" condition, and the call attempt is blocked.

If the base station removes the idle tone during the period of the 50 millisecond timer 37, the idle tone Schmitt circuit 14 applies a negative signal on terminal 308 to resistor 309 of the hook reset circuit, which reverse biases diode 222. The pulse from the 50 millisecond timer will now be blocked from resetting the hook bistable 35.

If the mobile station goes "off hook" to answer a call after all seven digits of its calling code are received, the selector inverter circuit 29 applies a negative signal on conductor 115 to resistor 304 of the hook reset circuit, which reverse biases diode 302, thereby preventing any pulses from resetting the hook bistable circuit 35.

In the manual mode of operation, a negative signal is applied on conductor 56 to diode 310, which reverse biases diode 222, and prevents the 50 millisecond timer 37 from resetting the hook bistable 35.

Handset control

The handset control 45 (FIG. 2*b*) includes transistors 170 and 171 which form NOR gates, and transistor switches 172 and 173. When the mobile is "on hook," the negative signal on conductor 162 connected to the collector of transistor 161 of the hook bistable circuit 35 is applied to the base of transistor 170, and causes transistor 170 to conduct. A negative signal on line 125 from the selector inverted 29 can likewise hold transistor 170 in conduction. The positive signal developed at the collector of transistor 170 drives transistor 171 into saturation. The collector of transistor 171 is therefore negative causing transistor 172 to be saturated and transistor 173 to be cutoff. Transistor 172 when conducting shorts the audio line 175 from the microphone to its shield which is grounded. With transistor 173 cutoff, the audio line 176 from the output of the receiver is interrupted. Accordingly, the lines from the microphone and earpiece in the handset are both disabled.

When the mobile goes "off hook" the oscillator control gate 41 (FIG. 2*c*) applies a positive potential on line 178 to the base of transistor 170. This holds transistor 171 conducting so that the handset remains muted while connect tone is being transmitted. When the mobile has correctly received a call, or completed identification, the positive signal from the selector inverter 29 on line 125 together with the positive signal on line 162 from the hook bistable circuit 35 are applied to the base of transistor 170 which turns off the transistor 170 and drives transistor 171 into cut-off. The collector of transistor 171 goes positive causing switch transistor 172 to be cut-off and switch transistor 173 to be conducting. This removes the ground from the microphone line 175, and the line 176 from the receiver is connected through transistor 173 to the line 177 which goes to the earpiece. This permits the mobile subscriber to answer the incoming call, and normal telephone communication can take place.

When the mobile station goes "on hook" after the completion of a call, the hook switch operates the Schmitt trigger 33 so that it returns to its original state. A negative signal is applied from the collector of transistor 152 of the Schmitt trigger through the resistor 156 to the base of transistor 160 of the hook bistable 35. This causes the transistor 160 to turn on and the transistor 161 to turn off. The negative signal from transistor 161 is applied on line 162 to the handset control 45 and as mentioned before the microphone and the earpiece on the handset are disabled. A positive pulse is applied from the collector of transistor 160 through conductor 163 to the base of transistor 130 in the 750 millisecond timer 24. Timer 24 therefore becomes activated and applies a positive signal to the identifier bistable 49 through conductor 133.

Identifier bistable and astable

The identifier bistable 49 inhibits action of the identifier astable 50 and the parity bistable 52 except when mobile identification and disconnect signals are being transmitted. The identifier bistable 49 (FIG. 2*c*) includes transistors 180 and 181 which are normally in saturation, and transistor 182 which is normally cut off. To provide a disconnect signal, the positive signal from 750 millisecond timer 24 on conductor 133 is applied to the base of transistor 180 and drives the same into cut off. The negative signal on line 132 from timer 24 is applied to the base of transistor 182 of the identifier bistable 49. This causes the bistable to change state and removes the inhibit signal applied from transistor 180 through conductor 185 to the identifier astable 50, and the inhibit signal from transistor 182 through conductor 186 to the parity bistable 52. The identifier astable therefore starts to oscillate and acts to transmit the disconnect signal.

The identifier astable 50 includes transistors 188 and 189 connected in an astable multivibrator circuit. Transistor 188 is normally clamped in cut off condition by the signal on conductor 185 from the identifier bistable 49. When the clamping voltage is removed, the astable oscillates and generates a negative 25 millisecond pulse every 50 milliseconds. These pulses are applied from the collector of transistor 189 through conductor 190 to the base of the transistor 301 of the oscillator control gate 41. Transistor 301 conducts on each negative pulse which in turn activates transistor 42 in the gated amplifier 28 and the tone from oscillator 43 is applied to the transmitter 30. The hook bistable 35 has been reset so that the potential on conductor 163 releases the frequency change circuit 44, and the oscillator 43 provides the disconnect tone of 1336 cycles. Thus, disconnect tone is applied to the transmitter 30 for 25 milliseconds out of every 50 milliseconds for the period of 750 milliseconds while the timer 24 is actuated.

The pulses from the identifier astable 50 are also applied through conductor 190 to the base of transistor 120 in the control gate 40. Since the selector inverter 29 has been reset, the input on line 115 to the base of transistor 120 is positive and this transistor cuts off to actuate transistor 26 of the gated amplifier 28 to transmit guard tone. The negative pulses from the identifier astable 50 saturates transistor 120 of control gate 40 so that guard tone is cut off while the disconnect tone is applied. Since timer 24 has also actuated the transmitter 30 via the transmitter keyer 25, a disconnect signal consisting of alternate 25 millisecond pulses of disconnect and guard tone is transmitted for 750 milliseconds.

The reception of the disconnect signal at the base station returns the base station equipment to normal condition. After the 750 millisecond timer 24 relaxes it turns off the transmitter keyer 25 and the channel latch control circuit 16 unlocks. The mobile then begins to search for the new marked idle channel, and is ready for further operation.

Mobile to base station call

Considering now the initiation of a call at the mobile station, when the subscriber removes his handset, the hook-switch is operated and the Schmitt trigger circuit 33 (FIG. 2*b*) is actuated. If the mobile is receiving idle tone so that the inhibit circuit 34 does not block the pulse from the circuit 33, the hook bistable 35 is actuated. This applies a signal on conductor 163 which turns on the transmitter keyer 25, as previously described. The transmitter keyer turns off the busy lamp circuit 140, provides a light on the control head, and locks the channel latch circuit 16 to prevent channel hunting. The hook bistable 35 via conductor 162 turns on the 350 millisecond timer 36 which actuates the control gate 41. This causes the transmission of guard tone for 350 milliseconds. When the 350 millisecond timer 36 relaxes, it actuates the 50 millisecond timer 37 as previously described. Transistor 301 in the control gate 41 turns on from the negative signal on line 168 from the 50 millisecond timer 37 and connect tone is transmitted for 50 milliseconds. The hook bistable 35 has operated the frequency change circuit 44 so that the oscillator 43 provides the connect tone frequency of 1633 cycles.

When the base station receives the connect tone from the mobile unit, the base station removes idle tone from the marked channel and after a 250 millisecond delay transmits 50 milliseconds of seize tone on this channel. This signal is received and actuates the seize tone Schmitt trigger 15 which turns on activity checker 48 (FIG. 2*a*).

Activity checker

The activity checker includes transistors 192 and 193 which function as integrators and transistors 194 and 195 (FIG. 2*a*) which are connected in a Schmitt trigger circuit. Transistor 195 is normally in saturation. During manual operation, the negative potential applied to terminal 56 reverse biases diode 232 which enables the idle tone Schmitt trigger 14 to feed pulses into the base of transistor 192. Consequently, the activity checker will respond to both 600 and 1500 c.p.s. during manual operation.

During automatic operation, a positive voltage is applied from terminal 56 to the base of transistor 192 so that transistor 192 is not affected by the idle tone Schmitt circuit 14 and the activity checker is actuated only upon receipt of seize tone. When the seize tone is received, transistor 193 is driven into saturation. The negative potential at its emitter causes the capacitor 197 to charge negatively. When this has a sufficient charge to forward bias the base-emitter junction of transistor 194, the Schmitt trigger changes state so that transistor 194 is conducting and transistor 195 is turned off. Transistor 194 when conducting applies a pulse from its collector through conductor 199 to the pulse counter 19 and to the digit counter 21 to reset these counters.

A negative inhibit signal is applied on conductor 198 from the collector of transistor 195 to the hook inhibit gate 34. When the seize tone is removed, the capacitor 197 requires 190 milliseconds to discharge so that the hook inhibit gate is prevented from turning on during the reception of signalling from the base station. When the activity checker 48 turns off, the positive pulse at the collector of transistor 195 is applied through conductor 198 to the base of transistor 181 of the identifier bistable 49 (FIG. 2*c*). The identifier bistable operates to remove the clamp on the identifier astable 50 so that the identifier astable oscillates as previously described. The signal on line 185 from the identifier bistable is applied to bias off transistor 95 of the detector bistable 18 to block its output during mobile identification.

Pulses from the identifier astable 50 are applied through conductor 190 to the pulse counter 19 and to the parity bistable 52. The pulse counter 19 and digit counter 21 cooperate to interrupt the identifier astable 50 so that the pulses therefrom provide the pulse code corresponding to the code number set up by the connections of the pulse and digit counters. This is described in application Ser. No. 425,749 previously referred to. The identifier astable 50 operates through conductor 190 to actuate the control gate 41 to apply connect tone during each negative pulse from the identifier astable 50.

Parity bistable

The parity bistable 52 is a multivibrator which includes transistors 200 and 201. At the same time that the identifier bistable 49 removes the clamp from the identifier astable 50, so that it can start oscillating, it also removes the negative signal applied on conductor 186 to the base of transistor 201. The first positive pulse from the identifier astable 50 is applied through capacitor 205 and diode 206 to the base of transistor 201 turning it off and causing the bistable 52 to change state. A negative signal is then fed from the collector of transistor 201 to the base of transistor 120 of the oscillator control gate 40. This will hold transistor 120 saturated. When the first negative pulse from the astable 50 is applied to conductor 190, it is blocked by the diodes 204 and 206 so it is not applied to the transistors 200 and 201 of the parity bistable 52, and the bistable does not change state. However, the next or second positive pulse from the identifier astable 50 causes the parity bistable 52 to change state. A positive pulse is then fed from the collector of transistor 201 to the base of transistor 120 and this occurs simultaneously with a positive pulse from the astable to operate the control gate 40. Accordingly, transistor 120 cuts off and the control gate 40 actuates the gated amplifier 28 to apply guard tone from oscillator 27 to the transmitter 30 after every second pulse from the identifier astable.

When the complete code is transmitted, the digit counter 21 actuates the selector inverter 29 which applies a signal on conductor 115 to operate the identifier bistable 49, and on conductor 125 to operate the handset control circuit 45, all as previously described. The identifier astable 50 is therefore clamped and the handset is activated to receive dial tones from the base station.

Mobile dialing

When the dial tone is received by the mobile station, the subscriber may dial the number of a desired station in the usual manner. The dial inhibit circuit 54 (FIG. 2*b*) includes a transistor 208 having its collector connected to terminal 210 which is connected to the dial pulsing contacts in the telephone set. This transistor is normally conducting to effectually short circuit the contacts to prevent dialing operation. After mobile identification is completed, the handset control 45 applies a negative signal from the collector of transistor 170 to the base of transistor 208 of the dial inhibit circuit 54 driving it into cut-off. This removes the short circuit on the dial contacts.

The telephone dial also includes contacts which are closed when the dial is moved from its normal position. These contacts are connected to terminal 211 of the handset control 45 and the control gate 40. When the dial is operated and these contacts are closed, a positive signal is applied from terminal 211 to the base of transistor 171 of the handset control 45 which drives transistor 171 into saturation so that it operates switch transistors 172 and 173 to effectively disconnect the handset. In the control gate 40 the positive signal on terminal 211 is applied to the base of transistor 120 which cuts off and as explained previously this causes guard tone to be fed to the transmitter 30. Since the transmitter 30 had been turned on previously, guard tone is transmitted when the dial is moved from its normal position.

As the telephone dial operates, the dial pulsing contacts alternately open and close. Terminal 210 connected to these contacts is connected to the oscillator control gates 40 and 41 as well as to the dial inhibit circuit 54. The contacts connected to terminal 210 when open remove collector potential from transistor 120 of gate 40 (FIG. 2*c*) and remove the base voltage from transistor 121. Therefore, the guard tone is interrupted by the dial. The connection to the oscillator control gate 41 actuates the control gate during the time that the contacts are open to apply connect tone. Accordingly, the dialing action produces guard tone interrupted by connect tone to form the dial pulses. After dialing, the mobile subscriber completes the call as on a standard land line telephone. Upon completion of the call when the mobile station goes "on hook" the disconnect signal is again transmitted to the base station as explained previously.

In the foregoing description, the points marked A—, B—, C—, D— and E— are at substantially the same potential, and are connected to different points on the power supply to provide the desired filtering. Similarly, points marked A+, B+ and C+ are connected to different points on the power supply filter, with A+ being more positive than B+ and C+ to provide a reverse bias to hold transistors cut off, as shown by the circuits including transistors 80, 89 and 170 in FIG. 2*b*.

The supervisory unit of the invention provides control of mobile radio telephone equipment so that completely automatic operation is provided. The person using the mobile substation therefore uses the telephone in exactly the same way as he would use a wire connected telephone in an automatic system. The mobile substation provides signals to identify itself to select a called station and to provide the connect and disconnect functions required. A large number of different controls are provided by the equipment and many of the elements perform in more than one capacity to thereby simplify the required equipment. The equipment has been found to be highly satisfactory in use.

We claim:

1. A supervisory unit for controlling a radio-telephone system including in combination, detector means for receiving tone signal groups and for producing direct current pulses in response to tone signals of particular frequencies, pulse selector means coupled to said detector means for identifying a predetermined code formed by pulse groups, an astable circuit for producing regularly recurring pulses, oscillator means for producing tones of first and second frequencies, and control means coupled to said astable circuit and to said oscillator means for controlling operation of said astable circuit and for causing said oscillator means to produce pulses of tones in response to pulses from said astable circuit, said control means being coupled to said selector means and responsive thereto to interrupt said astable circuit to produce pulse groups corresponding to the predetremined code.

2. A supervisory unit for controlling radio-telephone equipment at a station including in combination, detector means for receiving tone signal groups and for producing direct current pulses in response to tone signals of particular frequencies, said detector means having means responsive to a control signal to change the frequencies to which said detector means respond, pulse selector means coupled to said detector means for identifying a predetermined code formed by pulse groups, an astable circuit for producing regularly recurring pulses, oscillator means for producing tones of first and second frequencies, and control means coupled to said astable circuit and to said oscillator means for controlling operation of said astable circuit and for causing said oscillator means to produce pulses of tones in response to pulses from said astable circuit for providing control operations, said control means being coupled to said selective means and responsive thereto to interrupt said astable circuit to produce pulse groups corresponding to the predetermined code for identifying the station.

3. A supervisory unit for controlling radio-telephone equipment at a station which includes a dial telephone substation and radio transmitter and receiver means for transmitting and receiving voice and control sigals for the telephone substation, said supervisory unit including in combination, detector means for receiving audio tone signal groups from the receiver means and for producing direct current pulses in response to tone signals of particular frequencies, pulse selector means coupled to said detector means for identifying a predetermined code formed by pulse groups, control means coupled to the telephone substation for providing operation thereof, said selector means being coupled to said control means to operate the same in response to reception of the predetermined code, an astable circuit for producing regularly recurring pulses, oscillator means producing tones of a plurality of frequencies, said control means being coupled to said astable circuit and to said oscillator means for controlling operation of said astable circuit and for applying tones from said oscillator means to the transmitter means for providing control operations in response to pulses from said astable circuit, said control means being responsive to dial pulses from the telephone substation to apply tone pulses from said oscillator means to the transmitter means.

4. A supervisory unit for controlling radio-telephone equipment at a station which includes a dial telephone substation and radio transmitter and receiver means for transmitting and receiving voice and control signals for the telephone substation, said supervisory unit including in combination, detector means for receiving tone signal groups from the receiver means and for producing direct current pulses in response to tone signals of particular frequencies, pulse selector means coupled to said detector means for identifying a predetermined code formed by pulse groups, control means coupled to the telephone substation for providing operation thereof, said selector means being coupled to said control means to operate the same in response to the reception of the predetermined code, an astable circuit for producing regularly recurring pulses, oscillator means for producing tones of a plurality of frequencies, said control means being coupled to said astable circuit and to said oscillator means for controlling operation of said astable circuit and for causing said oscillator means to apply alternate tones of different freqeuncies to the transmitter means for providing disconnect action in response to pulses from said astable circuit, said control means being responsive to said selector means to interrupt said astable circuit to produce pulse groups corresponding to the predetermined code and to apply tones representing said pulse groups to the transmitter means for identifying the substation, and said control means being responsive to dial pulses from the telephone substation to apply tone pulses from said oscillator means to the transmitter means.

5. A supervisory unit for controlling radio-telephone equipment at a station which includes a dial telephone substation and radio transmitter and receiver means for transmitting and receiving voice and control signals for the telephone substation, said supervisory unit including in combination, detector means for receiving tone signal groups from the receiver means and for producing direct current pulses in response to tone signals of particular frequencies, pulse selector means coupled to said detector means for identifying a predetermined code formed by pulse groups, control means coupled to the telephone substation for providing operation thereof, said selector means being coupled to said control means to operate the same in response to the reception of the predetermined code, an astable circuit for producing regularly recurring pulses, oscillator means for producing tones of a plurality of frequencies, said control means being coupled to said astable circuit, said oscillator means and said selector means, said control means being responsive to said selector means to interrupt said astable circuit to produce pulse groups corresponding to the predetermined code and to apply pulsed tone groups representing said pulse groups to the transmitter means for identifying the substation, and said control means being responsive to dial pulses from the telephone substation to apply pulsed tone groups from said oscillator means to the transmitter means.

6. A supervisory unit for controlling radio-telephone equipment at a station which includes a dial telephone substation and radio transmitter and receiver means for transmitting and receiving voice and control signals for the telephone substation, said supervisory unit including in combination, detector means for receiving tone signal groups from the receiver means and for producing direct current pulse in response to tone signals of particular frequencies, pulse selector means coupled to said detector means for identifying a predetermined code formed by pulse groups, control means coupled to the telephone substation for providing operation thereof, said selector means being coupled to said control means to operate the same in response to the reception of the predetermined code, an astable circuit for producing regularly recurring pulses, and oscillator means for producing tones of a plurality of frequencies, said control means including timer means coupled to said oscillator means for producing an acknowledge tone of a given time duration, said timer means being coupled to said astable circuit for actuating the same to cause said oscillator means to produce pulsed tones of the given time duration for providing disconnect operation, said astable circuit being coupled to said selector means and controlled thereby to produce the pulse groups of the predetermined code, said oscillator means producing pulsed tone groups corresponding to said pulse groups for identifying the substation, said control means applying said pulsed tone groups from said oscillator means to the transmitter means.

7. A supervisory unit for controlling radio-telephone equipment at a station which includes a dial telephone substation and radio transmitter and receiver means for transmitting and receiving voice and control signals for the telephone substation, said supervisory unit including in combination, detector means for receiving tone signal groups from the receiver means and for producing direct current pulses in response to tone signals of particular frequencies, pulse selector means coupled to said detector means for identifying a predetermined code formed by pulse groups, control means coupled to the telephone substation for providing operation thereof, said selector means being coupled to said control means to operate the same in response to the reception of the predetermined code, an astable circuit for producing regularly recurring pulses, and oscillator means for producing tones of a plurality of frequencies, said control means including timer means coupled to said oscillator means for producing an acknowledge tone of a given time duration, said timer means being coupled to said astable circuit for actuating the same to cause said oscillator means to produce pulsed tones of the given time duration for providing disconnect operation, said astable circuit being coupled to said selector means and controlled thereby to produce pulse groups corresponding to the predetermined code and being coupled to said oscillator means to operate the same to produce pulsed tone groups for identifying the substation, said control means being responsive to dial pulses from the telephone substation to cause said oscillator means to produce further pulsed tone groups, and acting to apply such pulsed tone groups to the transmitter means.

8. A supervisory unit for controlling radio-telephone equipment at a station which includes a dial telephone substation and radio transmitter and receiver means for transmitting and receiving voice and control signals for the telephone substation, said supervisory unit including in combination, detector means for receiving tone signal groups from the receiver means and for producing direct current pulses in response to tone signals of particular freqencies, pulse selector means coupled to said detector means for identifying a predetermined code formed by pulse groups, control means coupled to the telephone substation, said selector means being coupled to said control means to operate the same in response to the reception of the predetermined code, an astable circuit for producing regularly recurring pulses, oscillator means for producing tones of a plurality of frequencies, said control means including timer means coupled to said oscillator means for producing an acknowledge tone of a given time duration, said timer means being coupled to said astable circuit for actuating the same to cause said oscillator means to produce pulsed tones of the given time duration for providing disconnect operation, said astable circuit being coupled to said selector means and controlled thereby to produce pulses corresponding to the predetermined code for identifying the substation, said control means being responsive to dial pulses from the telephone substation to produce tone pulses, and keyer means for the transmitter means coupled to said control means, said control means acting to apply said pulses produced by said oscillator means to the transmitter means and operating said keyer means to cause transmission of the tones.

9. A supervisory unit for controlling radio-telephone equipment at a station which includes a dial telephone substation having a handset and a hook-switch, and radio transmitter and receiver means for transmitting and receiving voice and control signals for the telephone substation, said supervisory unit including in combination, detector means for receiving tone signal groups from the receiver means and for producing direct current pulses in response to tone signals of particular frequencies, pulse selector means coupled to said detector means for identifying a predetermined code formed by pulse groups, control means coupled to the telephone substation, said selector means being coupled to said control means to operate the same in response to the reception of the predetermined code, an astable circuit for producing regularly recurring pulses, and oscillator means for producing tones of a plurality of frequencies, said control means including timer means coupled to said oscillator means for producing signals of given time durations, said astable circuit being coupled to said oscillator means for actuating the same to produce signals including pulsed tone groups, said control means including a bistable circuit for initiating control operations, and inhibit circuit means for connecting the hook-switch to said bistable circuit, said inhibit circuit means acting to prevent operation of said bistable circuit when the acknowledge signal and the disconnect signal are transmitted, said control means applying said signals produced by said oscillator means to the transmitter means.

10. A supervisory unit for controlling radio-telephone equipment at a station which includes a dial telephone substation having a handset and a hook-switch and radio transmitter and receiver means for transmitting and receiving voice and control signals for the telephone substation, said supervisory unit including in combination, detector means for receiving tone signal groups from the receiver means and for producing direct current pulses in response to tone signals of particular frequencies, pulse selector means coupled to said detector means for identifying a predetermined code formed by pulse groups, control means coupled to the telephone substation, said selector means being coupled to said control means to operate the same in response to the reception of the predetermined code, an astable circuit for producing regularly recurring pulses, and oscillator means for producing tones of a plurality of frequencies, said control means including timer means coupled to said oscillator means for producing an acknowledge signal of a given time duration, said timer means being coupled to said astable circuit for actuating the same to cause said oscillator means to produce pulsed tones of the given time duration for providing a disconnect signal, said control means including a bistable circuit for initiating control operations, and inhibit circuit means for connecting the hook-switch to said bistable circuit, said inhibit circuit means acting to prevent operation of said bistable circuit during transmission of the acknowledge signal and the disconnect signal, said astable circuit being coupled to said selector means, and controlled thereby to produce pulse groups corresponding to the predetermined code for identifying the substation, said control means causing said oscillator means to produce tone signal groups corresponding to said pulse groups and applying the same to the transmitter means.

11. A supervisory unit for controlling radio-telephone equipment at a station which includes a dial telephone substation having a handset and a hook-switch, and radio transmitter and receiver means for transmitting and receiving voice and control signals for the telephone substation, and wherein the radio transmitting and receiving means operate on a plurality of channels, said supervisory unit including in combination, detector means for receiving tone signals from the receiver means and for producing direct current signals in response to tone signals of particular frequencies, pulse selector means coupled to said detector means for identifying a predetermined code formed by direct current signals arranged as pulse groups, control means coupled to the telephone substation and including channel latch means for controlling the channel selecting operation of the transmitting and receiving means, said selector means being coupled to said control means to operate the same in response to the reception of the predetermined code, an astable circuit for producing regularly recurring pulses, oscillator means for producing tones of a plurality of frequencies, said control means including timer means coupled to said oscillator means for producing an acknowledge signal of a given time duration, said timer means being coupled to said astable circuit for actuating the same to cause said oscillator means to produce pulsed tones of the given time duration for providing a disconnect signal, said control means including a bistable circuit for initiating control operations, and inhibit circuit means for connecting the hook-switch to said bistable circuit, said inhibit circuit means being connected to said control means and acting to prevent operation of said bistable circuit during transmission of the acknowledge signal and the disconnect signal, and means connecting said channel latch means to said inhibit circuit means to cause operation of said bistable circuit only when the transmitting and receiving means is resting on an idle channel.

12. A supervisory unit for controlling radio-telephone equipment at a station which includes a dial telephone substation having a handset and a hook-switch, and radio transmitter and receiver means for transmitting and receiving voice and control signals for the telephone substation, and wherein the radio transmitting and receiving means operate on a plurality of channels, said supervisory unit including in combination, detector means for receiving tone signals from the receiver means and for producing direct current signals in response to tone signals of particular frequencies, pulse selector means coupled to said detector means for identifying a predetermined code formed by direct current signals arranged as pulse groups, control means coupled to the telephone substation and including channel latch means for controlling the channel selecting operation of the transmitting and receiving means, said selector means being coupled to said control means to operate the same in response to the reception of the predetermined code, oscillator means for producing tones of a plurality of frequencies, said control means being coupled to said oscillator means and selectively operating the same to produce an acknowledge signal and a disconnect signal, said control means including a bistable circuit for initiating control operations, and inhibit circuit means for connecting the hook-switch to said bistable circuit, said inhibit circuit means being connected to said control means and acting to prevent operation of said bistable current during transmission of the acknowledge signal and the disconnect signal, and means connecting said channel latch means to said inhibit circuit means to cause operation of said bistable circuit only when the transmitting and receiving means is resting on an idle channel.

13. A supervisory unit for controlling radio-telephone equipment at a station which includes a dial telephone substation having a handset and a hook-switch, and radio transmitter and receiver means for transmitting and receiving voice and control signals for the telephone substation, and wherein the radio transmitting and receiving means operates on a plurality of channels, said supervisory unit including in combination, detector means for receiving tone signals from the receiver means and for producing direct current signals in response to tone signals of particular frequencies, pulse selector means coupled to said detector means for identifying a predetermined code formed by direct current pulses arranged as pulse groups, control means coupled to the telephone substation and including channel latch means for controlling the channel selecting operation of the transmitting and receiving means and activity checking means providing a signal in response to the reception of tone signals, said selector means being coupled to said control means to operate the same in response to the reception of the predetermined code, oscillator means for producing tones of a plurality of frequencies, said control means being coupled to said oscillator means and selectively operating the same to produce an acknowledge signal, a connect signal and a disconnect signal, said control means including a bistable circuit for initiating control operations, and inhibit circuit means for connecting the hook-switch to said bistable circuit, said inhibit circuit means being connected to said control means and acting to prevent operation of said bistable circuit during transmission of the acknowledge signal and the disconnect signal, and means connecting said channel latch means and said activity checking means to said inhibit circuit to cause operation of said bistable circuit only when the transmitting and receiving means is resting on an idle channel and in the absence of signalling tones on such channel.

14. A supervisory unit for controlling radio-telephone equipment at a station which includes a dial telephone substation having a handset and a hook-switch, and radio transmitter and receiver means for transmitting and receiving voice and control signals for the telephone substation, and wherein the radio transmitting and receiving means operates on a plurality of channels, said supervisory unit including in combination, detector means for receiving tone signal from the receiver means and for producing direct current signals in response to tone signals of particular frequencies, control means coupled to the telephone substation and including channel latch means for controlling the channel selecting operation of the transmitting and receiving means and activity checking means providing a signal in response to the reception of tone signals, oscillator means for producing tones of a plurality of frequencies, said control means being coupled to said oscillator means and selectively operating the same to produce an acknowledge signal, a connect signal and a disconnect signal, said control means including an actuating circuit for initiating control operations, and inhibit circuit means for connecting the hook-switch to said actuating circuit, said inhibit circuit means being connected to said control means and acting to prevent operation of said actuating circuit during transmission of the acknowledge signal, the connect signal and the disconnect signal, and means connecting said channel latch means and said activity checking means to said inhibit circuit to cause operation of said actuating circuit only when the transmitting and receiving means is resting on an idle channel and in the absence of tone signal on such channel.

15. A supervisory unit for controlling radio-telephone equipment at a station which includes a dial telephone substation having a handset and a hook-switch, and radio transmitter and receiver means for transmitting and receiving voice and control signals for the telephone substation, said supervisory unit including in combination, detector means for receiving audio tone signals from the receiver means and for producing direct current pulses therefrom, pulse selector means coupled to said detector means for identifying a predetermined code formed by pulse groups, control means coupled to the telephone substation, said selector means being coupled to said control means to operate the same in response to the reception of the predetermined code, and oscillator means for producing tones of a plurality of frequencies, said control means including first and second timer means coupled to said oscillator means for producing signals of first and second time durations respectively, said control means including a bistable circuit for initiating control operations, and inhibit circuit means for connecting the hook-switch to said bistable circuit to actuate said bistable circuit in response to operation of the hook-switch, said bistable circuit being connected to said first timer means to cause said oscillator means to produce guard tones for a first time duration, said first timer being connected to said second timer to operate the same at the end of the first time duration and cause said oscillator means to produce connect tone for the second time duration, said selector means operating in response to reception of the predetermined code to cause said oscillator means to produce connect tone when actuated by said first timer.

16. A supervisory unit for controlling radio-telephone equipment at a station and which is capable of both automatic and manual operation, said unit including in combination, detector means for receiving tone signal groups and for producing direct current pulses in response to tone signals of particular frequencies, means responsive to manual operation of the unit for providing a control signal, said detector means having means responsive to said control signal to change the frequencies to which said detector means responds, pulse selector means coupled to said detector means for identifying a predetermined code formed by pulse groups, said pulse selector means having means providing a different mode of operation in response to said control signal, oscillator means for producing tones of first and second frequencies, and control means coupled to said pulse selector means and to said oscillator means for causing said oscillator means to produce pulses of tones for providing control operations.

No references cited.

KATHLEEN H. CLAFFY, Primary Examiner

JAN S. BLACK, Assistant Examiner

U.S. Cl. X.R.

325—55; 343—177